United States Patent
Greene, III et al.

(10) Patent No.: US 8,905,055 B2
(45) Date of Patent: Dec. 9, 2014

(54) FULL FLOW PRESSURE RELIEF VALVE

(75) Inventors: George C. Greene, III, Charleston, SC (US); Bruce M. Okkema, Zeeland, MI (US)

(73) Assignee: Water Missions International, Charleston, SC (US)

( * ) Notice: Subject to any disclaimer, the term of this patent is extended or adjusted under 35 U.S.C. 154(b) by 853 days.

(21) Appl. No.: 13/086,496

(22) Filed: Apr. 14, 2011

(65) Prior Publication Data
US 2011/0277850 A1 Nov. 17, 2011

Related U.S. Application Data

(60) Provisional application No. 61/334,345, filed on May 13, 2010.

(51) Int. Cl.
*F16K 17/00* (2006.01)
*F16K 17/04* (2006.01)

(52) U.S. Cl.
CPC ............. *F16K 17/046* (2013.01); *F16K 17/042* (2013.01)
USPC .............. 137/12; 137/467; 137/538; 251/297

(58) Field of Classification Search
USPC ......... 137/467, 536, 538, 2, 12; 251/297, 337
See application file for complete search history.

(56) References Cited

U.S. PATENT DOCUMENTS

| | | | | |
|---|---|---|---|---|
| 2,569,967 | A | * | 10/1951 | Ashton ......................... 137/113 |
| 3,027,912 | A | * | 4/1962 | Carr et al. ..................... 137/478 |
| 4,211,250 | A | | 7/1980 | Snyder |
| 4,276,901 | A | | 7/1981 | Lyons |
| 4,974,631 | A | | 12/1990 | Snyder |
| 5,195,556 | A | | 3/1993 | Fassbender |
| 5,215,116 | A | | 6/1993 | Voss |
| 5,743,285 | A | | 4/1998 | Shalkevich |
| 5,848,605 | A | * | 12/1998 | Bailey et al. .................. 137/540 |
| 6,367,498 | B1 | | 4/2002 | Brazier et al. |
| 6,651,636 | B1 | | 11/2003 | Albright |
| 6,672,565 | B2 | * | 1/2004 | Russell ......................... 251/297 |
| 6,936,176 | B1 | | 8/2005 | Greene, III et al. |
| 7,455,070 | B2 | * | 11/2008 | Hamza .......................... 137/467 |
| 2007/0056629 | A1 | | 3/2007 | Klein et al. |
| 2011/0056891 | A1 | | 3/2011 | Greene, III et al. |

* cited by examiner

*Primary Examiner* — Kevin Lee
*Assistant Examiner* — Phyllis Nichols
(74) *Attorney, Agent, or Firm* — Hammer & Associates, P.C.

(57) ABSTRACT

A full flow pressure relief valve includes a housing having an inlet opening on its bottom and an outlet opening on one of its side. A piston is positioned inside the housing adapted to move from a set position where the piston seals the inlet opening to a sprung position where the piston is removed from the inlet opening. A lock is biased by a spring in a perpendicular direction toward the side of the piston. The lock is adapted to hold the piston in the set position until a relief pressure is supplied in the inlet opening, where the lock is adapted to release the piston to the sprung position.

20 Claims, 5 Drawing Sheets

FULL FLOW PRESSURE RELIEF VALVE

CROSS-REFERENCE TO RELATED APPLICATIONS

This application claims the benefit of and priority to U.S. Provisional Patent Application Ser. No. 61/334,345 filed May 13, 2010.

FIELD OF THE INVENTION

The instant invention is directed toward pressure relief valves for use in fluid systems, like water treatment systems, and more specifically, a full flow pressure relief valve.

BACKGROUND OF THE INVENTION

A pressure relief valve (RV) is a type of valve used to control or limit the pressure in a system or vessel which can build up by a process upset, instrument or equipment failure, heat, etc. The pressure is relieved by allowing the pressurized fluid to flow from an auxiliary passage out of the system. The relief valve is designed or set to open at a predetermined set pressure to protect pressure vessels and other equipment from being subjected to pressures that exceed their design limits. When the set pressure is exceeded, the relief valve becomes the "path of least resistance" as the valve is forced open and a portion of the fluid is diverted through the auxiliary route. As the fluid is diverted, the pressure inside the vessel will drop.

For example, in a chlorination system (or other water treatment systems), a pressure relief valve may be utilized to prevent the chlorinator from becoming over pressurized. Water may be pumped into the chlorinator by a pump. The pump may be capable of generating water pressure of, for example, between 10 to 60 psig. However, the chlorinator may be designed to operate at pressures up to 50 psig. Thus, there is clearly a need for a pressure relief valve associated with a chlorination system.

One problem with known pressure relief valves is that the pressure relief valve has corrosive parts that are exposed to the fluid. As should be understood, this is especially problematic for chlorination systems, or other water treatment systems.

Another problem with known pressure relief valves is that when sprung, the pressure drops in the system, but does not drop all the way to zero pressure. Some systems, like chlorination systems or water treatment systems, may desire the system to be completely purged of the fluid when the pressure relief valve is opened. This requires a "full flow" pressure relief valve, i.e., one that drops the pressure in the system all the way to zero.

The instant invention is designed to address the above mentioned problems.

DESCRIPTION OF DRAWINGS

For the purpose of illustrating the invention, there is shown in the drawings a form that is presently preferred; it being understood, however, that this invention is not limited to the precise arrangements and instrumentalities shown.

SUMMARY OF THE INVENTION

Figures 1, 2:
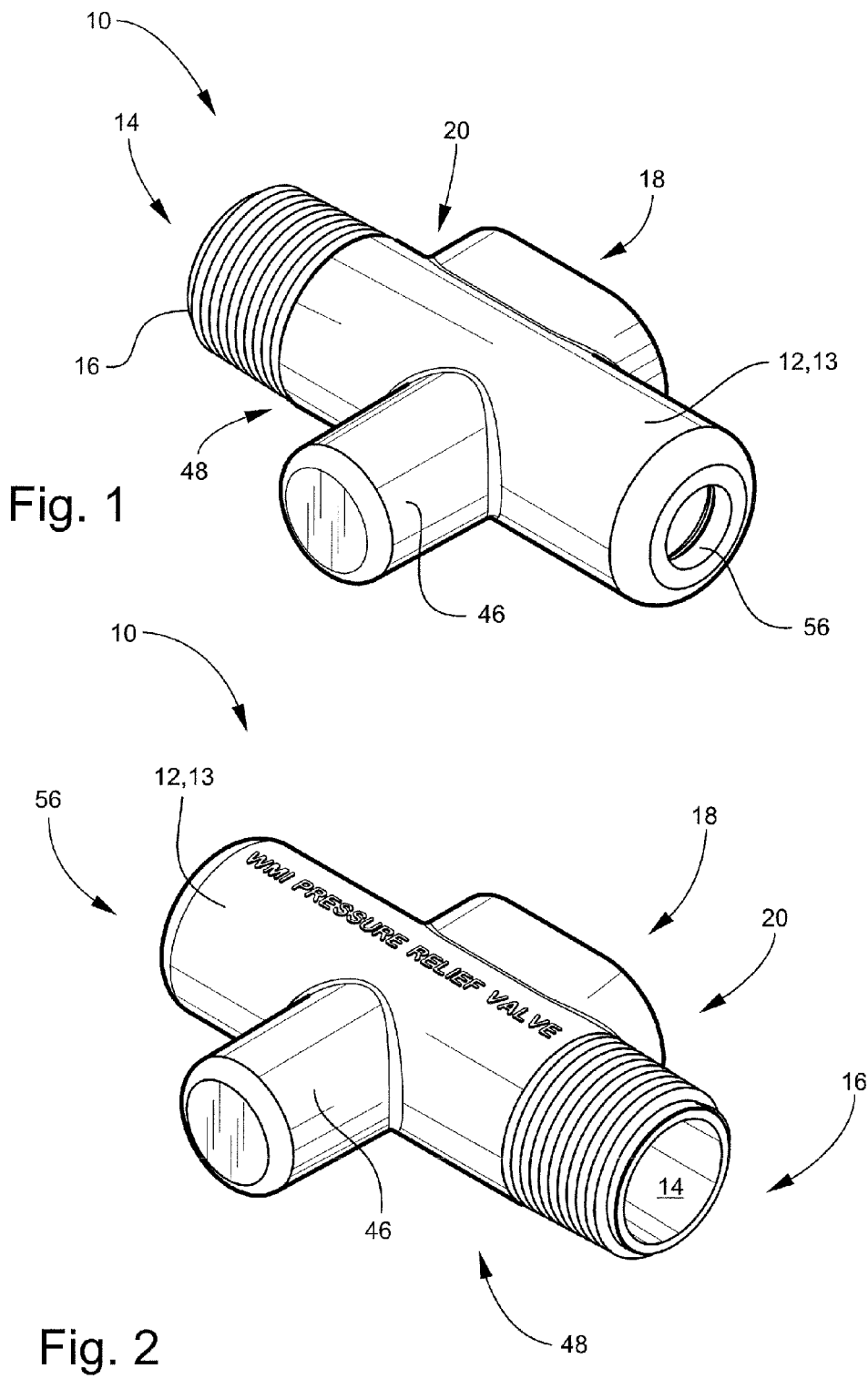
FIG. 1 shows a perspective view of one embodiment of the full flow pressure relief valve according to the instant invention.
FIG. 2 shows another perspective view of the full flow pressure relief valve from FIG. 1.
Figure 3:
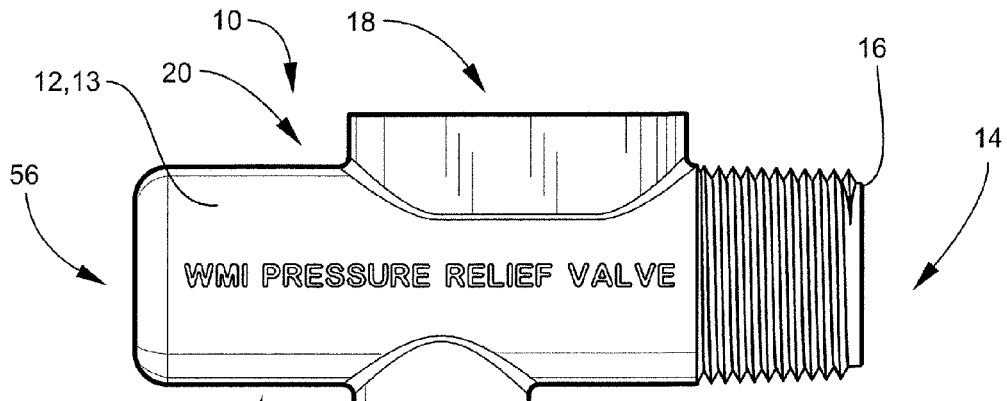
FIG. 3 shows a front view of the full flow pressure relief valve from FIG. 1.
Figure 4:
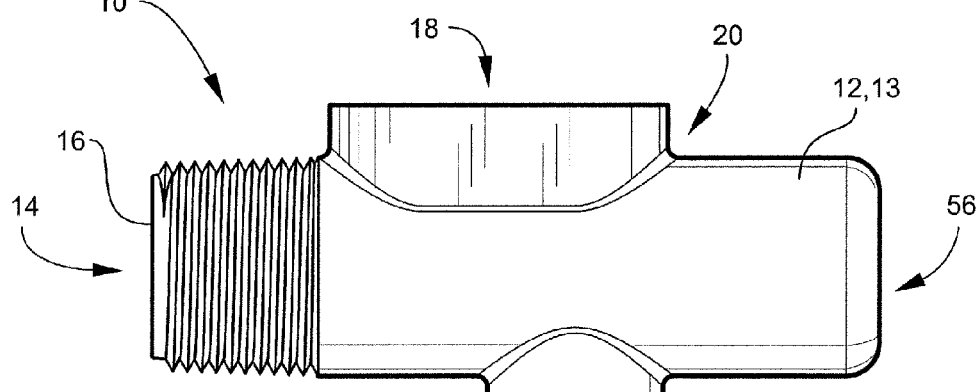
FIG. 4 shows a back view of the full flow pressure relief valve from FIG. 1.
Figure 5:
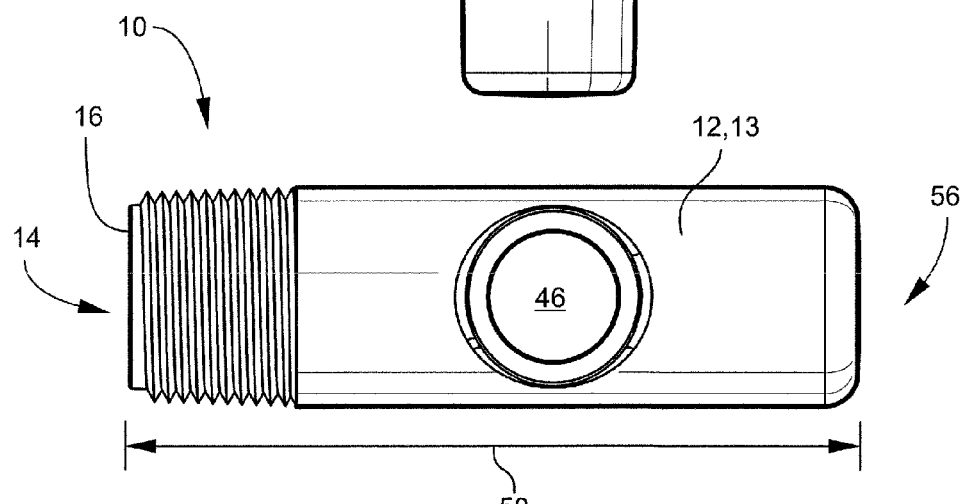
FIG. 5 shows a first side view of the full flow pressure relief valve from FIG. 1 of the side with the lock channel.
Figure 6:
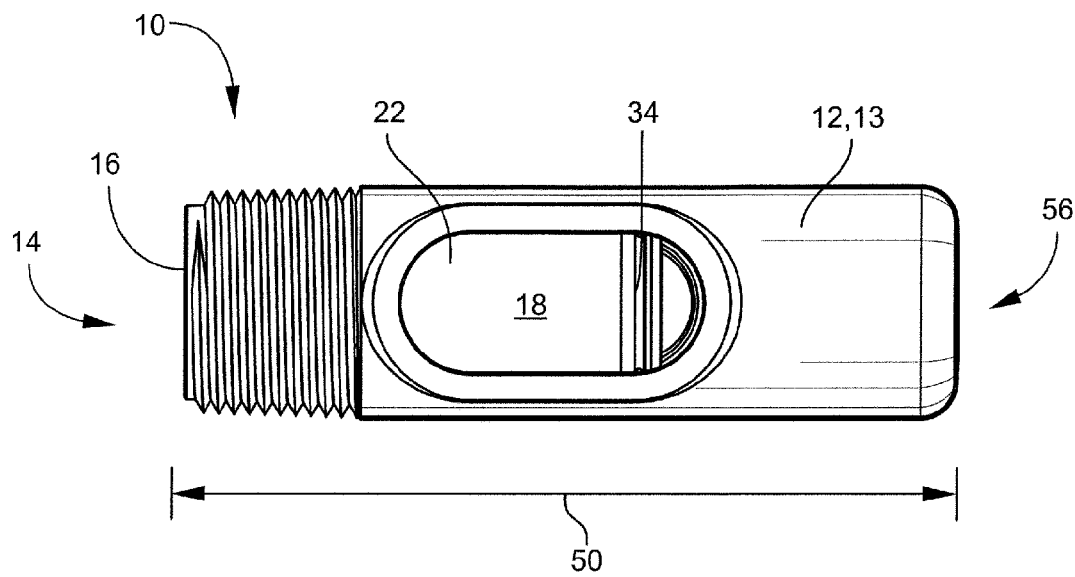
FIG. 6 shows a second side view of the full flow pressure relief valve from FIG. 1 of the side with the outlet opening.
Figure 7:
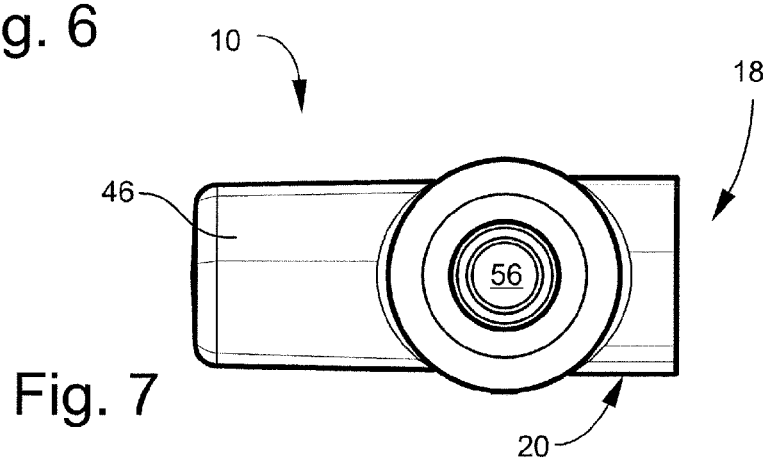
FIG. 7 shows a top view of the full flow pressure relief valve from FIG. 1.
Figure 8:
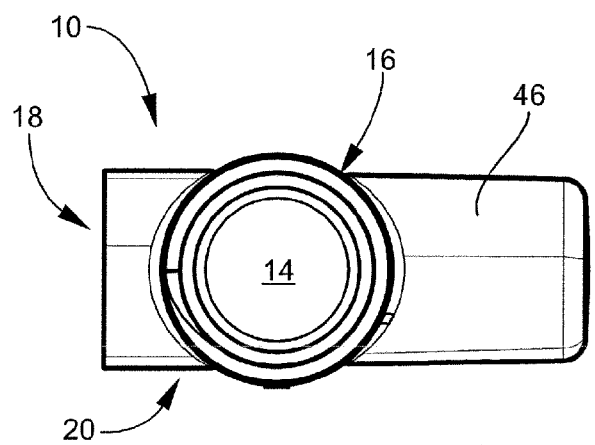
FIG. 8 shows a bottom view of the full flow pressure relief valve from FIG. 1.
Figures 9, 10:
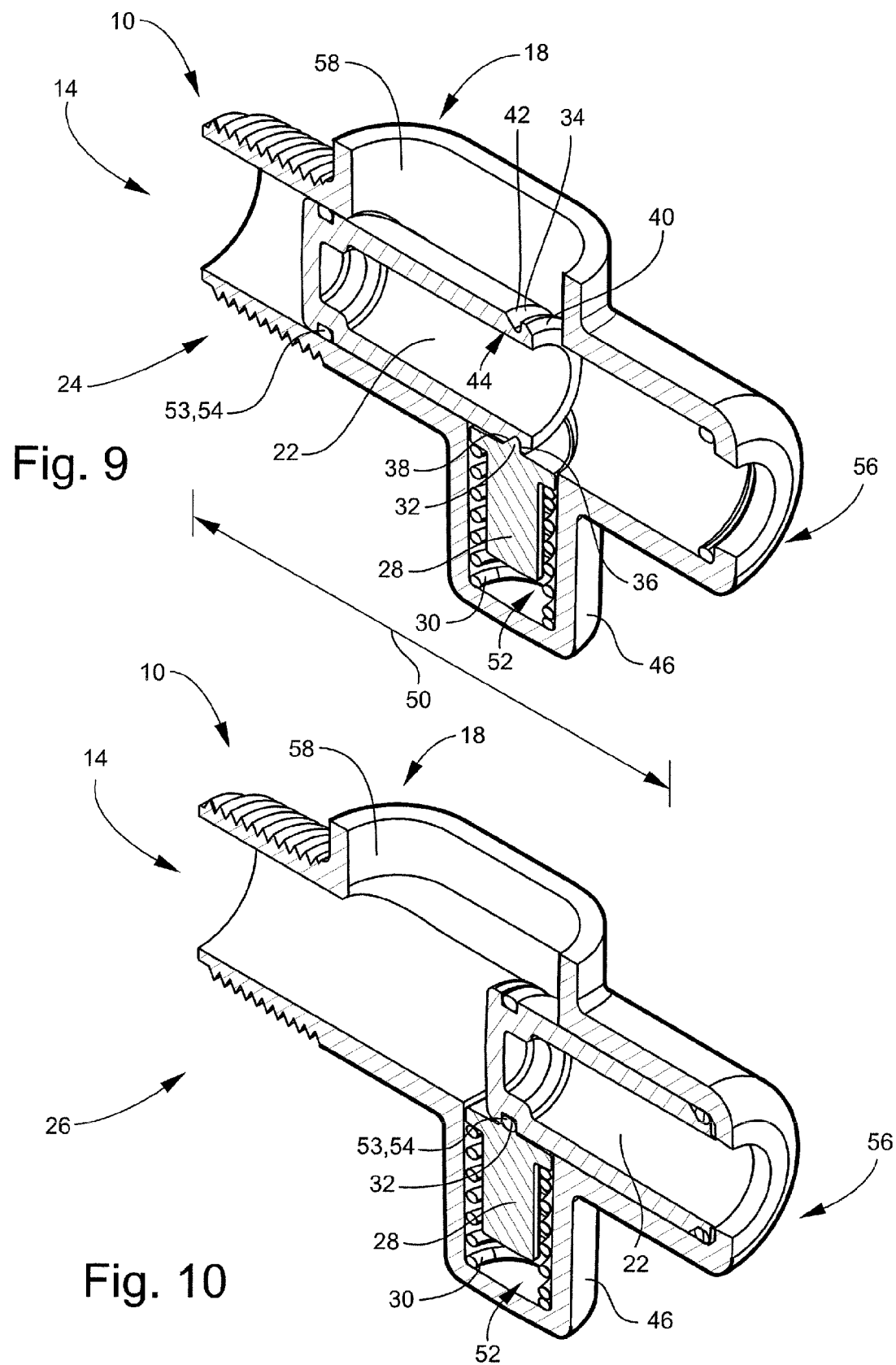
FIG. 9 shows a cross-sectional perspective view of the full flow pressure relief valve from FIG. 1 in the set position.
FIG. 10 shows another cross-sectional perspective view of the full flow pressure relief valve from FIG. 1 in the sprung position.

The instant invention is directed toward a full flow pressure relief valve. The full flow pressure relief valve includes a housing having an inlet opening on its bottom and an outlet opening on one of its side. A piston is positioned inside the housing adapted to move from a set position where the piston seals the inlet opening to a sprung position where the piston is removed from the inlet opening. A lock is biased by a spring in a perpendicular direction toward the side of the piston. The lock is adapted to hold the piston in the set position until a relief pressure is supplied in the inlet opening, where the lock is adapted to release the piston to the sprung position.

DETAILED DESCRIPTION OF THE DRAWINGS

Referring to the drawings, wherein like numerals indicate like elements, there is shown in FIGS. 1-10 an embodiment of a full flow pressure relief valve 10. Full flow pressure relief valve 10 may be for providing pressure relief to a system. For example, full flow pressure relief valve 10 may be for providing pressure relief to a water treatment system, and more specifically, pressure relief valve 10 may be for providing pressure relief to the chlorinator of a water treatment system. However, the invention is not so limited, and full flow pressure relief valve 10 may be utilized for providing pressure relief to any fluid system which may be susceptible to over pressurization. The full flow pressure release valve 10 may generally include a housing 12, a piston 22, a lock 28, and a spring 30. These parts and there functions will be described in greater detail below.

The housing 12 may be included in full flow pressure relief valve 10. See FIGS. 1-10. Housing 12 may be for providing the housing or structure of pressure relief valve 10. Housing 12 may be any size or shape housing for providing the structure of pressure relief valve 10. In one embodiment, housing 12 may be a cylindrical housing 13, as shown in FIGS. 1-10. Cylindrical housing 13 may be any size cylindrical housing. Housing 12 may have a length 50 (see FIGS. 5-6 and 9). Length 50 may be any desired length and may be adjusted depending on the size, space, pressure, etc. of the system utilizing valve 10. Housing 12 may be made out of any material, including, but not limited to, non-corrosive materials like plastics and rubber. Housing 12 may have an inlet opening 14 on its bottom 16 and an outlet opening 18 on one of its sides 20.

Inlet opening 14 may be included in full flow pressure relief valve 10. See FIGS. 1-6 and 8-10. Inlet opening 14 may be for providing an opening for fluid to enter valve 10. Inlet opening 14 may be any size or shape opening for allowing fluid to enter valve 10. Inlet opening 14 may be positioned anywhere on housing 12, including, but not limited to, being on the bottom 16. Inlet opening 14 may be designed to connect to any size or shaped conduit requiring a pressure relief valve. As shown in the Figures, in one embodiment inlet opening 14 may be threaded for allowing full flow pressure relief valve 10 to be screwed onto various sized pipes or conduits. In one embodiment, the inlet opening 14 may be adapted to fit a 1" diameter pipe with a threaded fitting.

Outlet opening 18 may be included in full flow pressure relief valve 10. See FIGS. 1-4 and 6-10. Outlet opening 18 may be for providing an opening for fluid to exit valve 10. Outlet opening 18 may be any size or shape opening for allowing fluid to exit valve 10. Outlet opening 18 may be positioned anywhere on housing 12, including, but not limited to, being on one of its sides 20. Outlet opening 18 may be designed to connect to any size or shaped conduit for moving the fluid away from the system. Alternatively, outlet opening 18 may be positioned over a drain or reservoir, where the fluid may flow from outlet opening 18 into such drain or reservoir. Outlet opening 18 may have any shape. In one embodiment, outlet opening 18 may have an oval shape 58, as shown in the Figures. Oval shape 58 may allow outlet opening 18 to have a greater area (i.e. is a larger opening) on the surface area of housing 12.

In one embodiment, the inlet opening 14 of the full flow pressure relieve valve 10 may be smaller than the outlet opening 18. This feature may allow the pressure relief valve 10 to be "full flow", i.e., the valve 10 provides zero pressure to the inlet opening 14 when in the sprung position 26.

The piston 22 may be included in full flow pressure relief valve 10. See FIGS. 9-10. Piston 22 may be for providing a piston sealable (or pluggable) within housing 12 and movable between a set position 24 and a sprung position 26. Piston 22 may be any type of piston sealable within housing 12 and movable between set position 24 and sprung position 26 and may be designed according to the size and shape of housing 12. In one embodiment, the piston 22 may be a cylindrical piston positioned inside the cylindrical housing 13. The piston 22 may be adapted to move from a set position 24 where the piston 22 seals the inlet opening 14 (see FIG. 9) to a sprung position 26, where the piston 22 is removed from the inlet opening 14 (see FIG. 10). In the set position 24, piston 22 may be sealed to or plugged in inlet opening 14 by any means, including, but not limited to a seal 53 (see FIGS. 9-10). Seal 53 may be any type of seal, including, but not limited to, an O-ring 54. O-ring 54 may be any standard o-ring seal.

Lock 28 may be included in full flow pressure relief valve 10. See FIGS. 9-10. Lock 28 may be for locking piston 22 in the set position 24 up until a release pressure is supplied in inlet opening 14. Lock 28 may be any locking device capable of locking piston 22 in the set position 24 up until a release pressure is supplied in inlet opening 14. In one embodiment, the lock 28 may be biased by a spring 30 in a perpendicular direction toward the piston 22. The lock 28, in association with the spring 30, may be adapted to hold the piston 22 in the set position 24 (see FIG. 9) until a relief pressure is supplied in the inlet opening 14. When the relief pressure (or greater) is supplied in the inlet opening 14, the lock 28 may be adapted to release the piston 22 to move to the sprung position 26 (see FIG. 10). Most pressure relief valves have the spring directly biasing the piston in a parallel fashion. However, the instant invention is unique in that the spring 30 is biasing lock 28 in a perpendicular direction to the piston 22. As a result, when the piston is moved to the sprung position 26 (see FIG. 10) the spring 30 is not biasing the piston 22 to return to the set position 24. This unique feature of valve 10 allows the valve to be a "full flow" pressure relief valve and provide zero pressure to said inlet opening when in said sprung position.

In one embodiment, the lock 28 may include a lock protrusion 32 and the piston 22 may include a corresponding piston groove 34. See FIGS. 9-10. In this embodiment, the lock protrusion 32 may be adapted to be received by piston groove 34 around the top of the piston 22. The lock protrusion 32 may have a flat top 36 and an angled bottom 38. Similarly, the piston groove 34 may have a flat top 40 and an angled bottom 42. The angled bottoms 38 and 42 of the lock protrusion 32 and the piston groove 34 may force the lock 28 to compress the spring 30 when the piston 22 is forced up from the inlet opening 14. The force of the spring 30 and the angle 44 of the angled bottoms may lock the piston 22 into the set position 24 up until the relief pressure, where the spring 30 will compress and the lock protrusion 32 will move out of the piston groove 34, thereby allowing the piston to move to the sprung position 26. In this embodiment, the release pressure may be adjusted by varying the angle 44 of the angled bottoms 38 and 42 of the lock protrusion 32 and the piston groove 34, or by varying the strength of the spring 30.

The housing 12 of full flow pressure relief valve 10 may further include a lock channel 46. See FIGS. 1-5 and 7-10. Lock channel 46 may be for housing lock 28 and spring 30. Lock channel 46 may be any size or shaped device for housing lock 28 and spring 30. Lock channel 46 may be positioned on the opposite side 48 of the outlet opening 18. In this embodiment of full flow pressure relief valve 10 with the lock channel 46, the release pressure may be adjustable by the factors described above and/or by increasing or decreasing the length of the lock channel 46 or by adding or removing shims 52 between the spring 30 and the end of the lock channel 46. The shims 52 may be sized to modify the relief pressure by any pressure increments, including, but not limited to, increments of 10 psi.

Spring 30 may be included in full flow pressure relief valve 10. See FIGS. 9-10. Spring 30 may be for biasing lock 28 perpendicularly toward piston 22. Spring 30 may be any device capable of biasing lock 28 perpendicularly toward piston 22. Spring 30 may be any size, type or shape spring. In one embodiment, spring 30 may be a standard helical spring.

The housing 12 of full flow pressure relief valve 10 may also include a hole 56. See FIGS. 1-7 and 9-10. Hole 56 may be for providing access to the end of piston 22 for moving it from the sprung position 26 back to the set position 24. Hole 56 may be provided anywhere on housing 12, including, but not limited to, at the opposite end of the inlet opening 14. The hole 56 may be adapted to allow access to the top of the piston 22. This may allow an operator of the relief valve 10 to push the piston 22 from the sprung position 26 back to the set position 24. Hole 56 may be any size or shape hole. In one embodiment, hole 56 may be too mall for an operators hands or fingers, thus, a tool may be required. The tool may be adapted to be inserted through the hole 56 to push down the piston 22. This tool may be a unique tool specifically designed for the instant pressure relief valve 10, or may be a standard screwdriver or any other tool capable of pushing down the piston 22.

In operation, when the piston 22 is in the set position 24 (see FIG. 9) the full flow pressure relief valve 10 may have no corrosive parts exposed. As such, the full flow pressure relief valve 10 may be constructed of all non-corrosive plastic or rubber parts (seals) except for the spring 30. However, the spring 30 may be completely sealed from the interior of the relief valve 10 when the piston is in set position 24. As a result, in the set position 24, no corrosive parts may be exposed.

The pressure relief valve of the instant invention may be configured to any relief pressure by varying the size and/or shape of valve 10. For example, the pressure relief valve may be configured to relief pressure (valve moves from set position to sprung position) at between 50 and 100 psi. In a more specific example, the pressure relief valve may be configured to relief pressure at 75 psi.

The full flow pressure relief valve 10, as described above, may be used on any system requiring a pressure relief valve. This may include, but is not limited to, being connected to a water treatment system. For an examples of various water treatment systems that full flow pressure relief valve 10 may be utilized on, see U.S. Pat. No. 6,936,176, and US Publication No. 2011/0056891. For use on such water treatment systems (or other fluid treatment systems), the full flow pressure relief valve 10 may be connected to any of the pressurized lines of the water treatment system, including, but not limited to, being connected to one of the chlorinator lines.

The instant invention also includes a method of manufacturing the full flow pressure relief valve, as described above.

Figure 11:
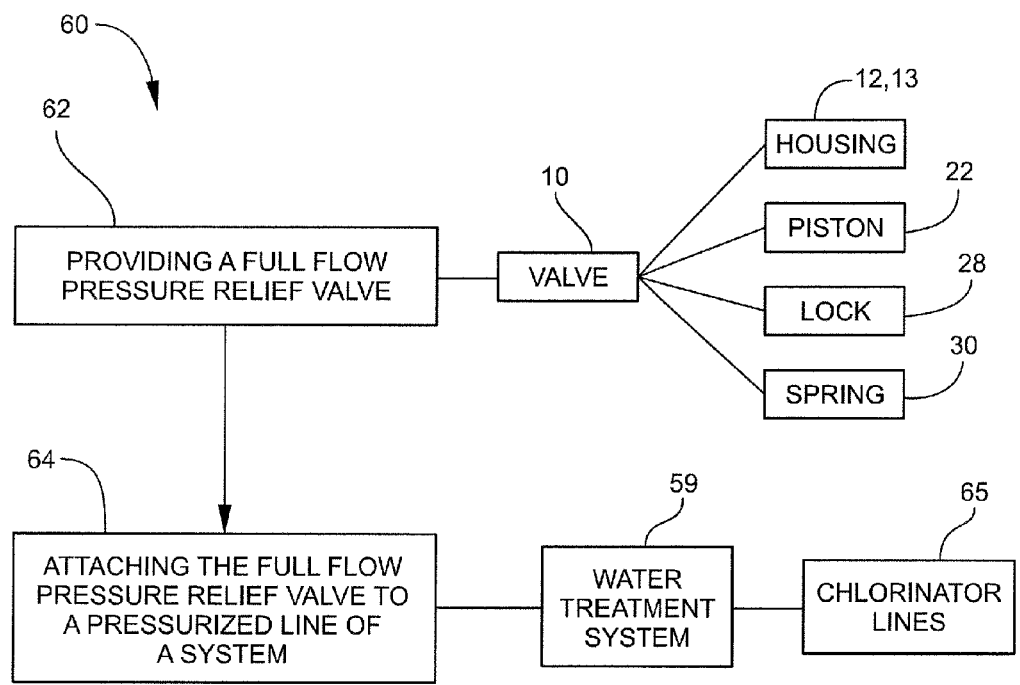
FIG. 11 shows a flow diagram of one embodiment of the method of relieving pressure in a system according to the instant invention.

The instant invention also includes a method 60 of relieving pressure in a system 59. See FIG. 11. Method 60 of relieving pressure in a system 59 may include any steps for relieving pressure in system 59. Method 60 may generally include the following steps: a step 62 of providing a full flow pressure relief valve 10, as described above; and a step 64 of attaching full flow pressure relief valve 10 to a pressurized line 65 of system 59. However, the invention is not so limited, and method 60 may also include any other steps for relieving pressure from system 59. In one embodiment, method 60 may be carried out on a water treatment system 59. In this embodiment, step 64 of attaching valve 10 to a pressurized line 65 may include attaching valve 10 to a pressurized chlorinator line 65.

The present invention may be embodied in other forms without departing from the spirit and the essential attributes thereof, and, accordingly, reference should be made to the appended claims, rather than to the foregoing specification, as indicated in the scope of the invention.

We claim:

1. A full flow pressure relief valve comprising:
   a housing having an inlet opening on its bottom and an outlet opening on its side;
   a piston positioned inside said housing adapted to move from a set position where said piston sealing said inlet opening to a sprung position where said piston being removed from said inlet opening;
   said piston being hollow and having an opening on one side and being solid on the opposite side which permits no material to pass through; and
   a lock biased by a spring in a perpendicular direction toward the side of said piston, said lock being adapted to hold said piston in said set position until a relief pressure is supplied in said inlet opening, where said lock releasing said piston to said sprung position.

2. The full flow pressure relief valve of claim 1 wherein, when said piston being in said set position, said pressure relief valve having no corrosive parts exposed.

3. The full flow pressure relief valve of claim 1 wherein said inlet opening being smaller than said outlet opening.

4. The full flow pressure relief valve of claim 3 whereby said outlet opening being larger than said inlet opening allowing said full flow pressure relief valve to provide zero pressure to said inlet opening when in said sprung position.

5. The full flow pressure relief valve of claim 1 wherein said housing being a cylindrical housing.

6. The full flow pressure relief valve of claim 1 wherein said lock including a lock protrusion adapted to be received by a piston groove around a top of said piston.

7. The full flow pressure relief valve of claim 6 wherein said lock protrusion and said piston groove having a flat top and an angled bottom.

8. The full flow pressure relief valve of claim 7 wherein said angled bottom of said lock protrusion and said piston groove forcing said lock to compress said spring when said piston being moved up from said inlet opening.

9. The full flow pressure relief valve of claim 7 wherein said release pressure being adjustable by varying the angle of said angled bottom of said lock protrusion and said piston groove.

10. The full flow pressure relief valve of claim 1 where said release pressure being adjustable by varying the strength of said spring.

11. The full flow pressure relief valve of claim 1 further comprising a lock channel on the opposite side of said outlet opening adapted for housing said lock and said spring.

12. The full flow pressure relief valve of claim 11 where said release pressure being adjustable by increasing or decreasing the length of said lock channel, or by removing shims between said spring and the end of said lock channel.

13. The full flow pressure relief valve of claim 1 where, when in said set position, said piston being sealed to said inlet opening by a seal.

14. The full flow pressure relief valve of claim 13 wherein said seal being an O-ring.

15. The full flow pressure relief valve of claim 1 further comprising a hole at the opposite end of said inlet opening, said hole being adapted to allow access for pushing said piston from said sprung position to said set position.

16. The full flow pressure relief valve of claim 1 wherein said outlet opening having an oval shape.

17. The full flow pressure relief valve according to any of claim 1 being connected to a water treatment system.

18. A full flow pressure relief valve comprising:
    a cylindrical housing having an inlet opening on its bottom and an outlet opening on its side having an oval shape;
    said inlet opening being smaller than said outlet opening thereby allowing said full flow pressure relief valve to provide zero pressure to said inlet opening when in a sprung position;
    a piston positioned inside said housing adapted to move from a set position where said piston sealing said inlet opening to said sprung position where said piston being removed from said inlet opening;
    said piston being hollow and having an opening on one side and being solid on the opposite side which permits no material to pass through;
    a lock biased by a spring in a perpendicular direction toward the side of said piston, said lock being adapted to hold said piston in said set position until a relief pressure is supplied in said inlet opening, where said lock releasing said piston to said sprung position;
    a lock channel on the opposite side of said outlet opening adapted for housing said lock and said spring; and
    a hole at the opposite end of said inlet opening, said hole being adapted to allow access for pushing said piston from said sprung position to said set position
    said lock including a lock protrusion adapted to be received by a piston groove around the top of said piston, said lock protrusion and said piston groove having a flat top and an angled bottom, wherein said angled bottom of said lock protrusion and said piston groove forcing said lock to compress said spring when said piston being moved up from said inlet opening;

said release pressure being adjustable by varying a parameter selected from the group consisting of: varying the angle of said angled bottom of said lock protrusion and said piston groove, varying the strength of said spring, increasing or decreasing the length of said lock channel, and adding or removing shims between said spring and the end of said lock channel;

wherein, when said piston being in said set position, said piston being sealed to said inlet opening by an O-ring seal and said pressure relief valve having no corrosive parts exposed.

19. A method of relieving pressure in a system comprising the steps of:

providing a full flow pressure relief valve comprising:

a housing having an inlet opening on its bottom and an outlet opening on its side;

a piston positioned inside said housing adapted to move from a set position where said piston sealing said inlet opening to a sprung position where said piston being removed from said inlet opening;

said piston being hollow and having an opening on one side and being solid on the opposite side which permits no material to pass through; and a lock biased by a spring in a perpendicular direction toward the side of said piston, said lock being adapted to hold said piston in said set position until a relief pressure is supplied in said inlet opening, where said lock releasing said piston to said sprung position;

attaching said full flow pressure relief valve to a pressurized line of said system.

20. The method of relieving pressure in a system of claim 19 where said system being a water treatment system.

* * * * *